United States Patent
Monta et al.

(10) Patent No.: US 11,858,530 B2
(45) Date of Patent: Jan. 2, 2024

(54) MANAGEMENT DEVICE, VEHICLE CONTROL DEVICE, AND MANAGEMENT METHOD

(71) Applicant: Panasonic Intellectual Property Management Co., Ltd., Osaka (JP)

(72) Inventors: Hiroki Monta, Osaka (JP); Rumi Ohnishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 137 days.

(21) Appl. No.: 17/549,479

(22) Filed: Dec. 13, 2021

(65) Prior Publication Data

US 2022/0204022 A1 Jun. 30, 2022

(30) Foreign Application Priority Data

Dec. 24, 2020 (JP) .................................. 2020-215876

(51) Int. Cl.
*H04W 4/44* (2018.01)
*B60R 1/27* (2022.01)
*B60W 60/00* (2020.01)

(52) U.S. Cl.
CPC ............ *B60W 60/001* (2020.02); *H04W 4/44* (2018.02); *B60W 2556/45* (2020.02)

(58) Field of Classification Search
CPC ............. G08G 1/096822; G08G 1/168; G08G 1/096844; G05D 1/0282; G05D 1/0274; G05D 1/0272; E04H 6/18
See application file for complete search history.

(56) References Cited

U.S. PATENT DOCUMENTS

| | | | | |
|---|---|---|---|---|
| 2018/0024548 | A1* | 1/2018 | Mielenz | G08G 1/096844 701/2 |
| 2018/0224865 | A1* | 8/2018 | Quast | G05D 1/0282 |
| 2020/0398826 | A1* | 12/2020 | Tsujino | G08G 1/168 |

FOREIGN PATENT DOCUMENTS

| | | | | |
|---|---|---|---|---|
| CN | 102535915 A | * | 7/2012 | ............... E04H 6/18 |
| CN | 108535685 A | * | 9/2018 | ............... G01S 5/02 |
| CN | 110352392 A | * | 10/2019 | ............. A01B 69/00 |
| JP | 6615210 | | 12/2019 | |

* cited by examiner

*Primary Examiner* — Yuri Kan, P.E.

(74) *Attorney, Agent, or Firm* — Greenblum & Bernstein, P.L.C.

(57) ABSTRACT

A management device includes a circuit. The circuit generates driving data of each of a plurality of areas, the driving data indicating a driving path in the area and causing a vehicle to autonomously drive along the driving path, while the vehicle is driving in each area, transmits driving data of an area next to the area to the vehicle via a base station of the area, and when driving data of a second area that is next to a first area is not transmitted to the vehicle via a base station of the first area while the vehicle is autonomously driving in the first area, after the vehicle has driven back to a previous area, transmits driving data of a different area that is located at a position from the previous area to a target spot to the vehicle via a base station of the previous area.

9 Claims, 11 Drawing Sheets

MANAGEMENT DEVICE, VEHICLE CONTROL DEVICE, AND MANAGEMENT METHOD

CROSS REFERENCE TO RELATED APPLICATION

The present application is based on and claims priority of Japanese Patent Application No. 2020-215876 filed on Dec. 24, 2020.

FIELD

The present disclosure relates to a management device for managing the driving of vehicles in, for example, an automated valet parking environment, or the like.

BACKGROUND

Conventionally, a device and the like that manage the driving of vehicles in a parking facility have been proposed (see, for example, Patent Literature 1 (PTL 1)). The device transmits data to each vehicle via a plurality of base stations that are disposed in the parking facility. Specifically, each base station transmits, to the vehicle that drives in a coverage area of the base station, data needed by the vehicle to autonomously drive through a coverage area next to the coverage area of the base station. Accordingly, when the vehicle drives into the next coverage area, the vehicle can autonomously drive through the next coverage area in accordance with the data transmitted in advance. The vehicle can thereby arrive at a target spot while autonomously driving through the coverage areas of the plurality of base stations in the parking facility.

CITATION LIST

Patent Literature

PTL 1: Japanese Patent No. 6615210

SUMMARY

However, the device according to PTL 1 can be improved upon.

In view of this, the present disclosure provides a management device capable of improving upon the above related art.

A management device according to one aspect of the present disclosure includes: a circuit; and at least one memory, wherein the circuit, in operation, in a case where a vehicle is to drive from a predetermined position to a target spot via a plurality of areas, generates driving data of each of the plurality of areas, the driving data indicating a driving path in the area and causing the vehicle to autonomously drive along the driving path; while the vehicle is driving in each of the plurality of areas, transmits driving data of an area next to the area to the vehicle via a base station of the area; and when driving data of a second area that is next to a first area that is one of the plurality of areas is not transmitted to the vehicle via a base station of the first area while the vehicle is autonomously driving in the first area, after the vehicle has driven back to a previous area where the vehicle was driving before driving into the first area, transmits driving data of a different area that is located at a position from the previous area to the target spot to the vehicle via a base station of the previous area.

A general and specific aspect disclosed above may be implemented using a system, a method, an integrated circuit, a computer program, or a computer-readable recording medium such as a CD-ROM, or may be implemented using any combination of systems, methods, integrated circuits, computer programs, or computer-readable recording media.

The management device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
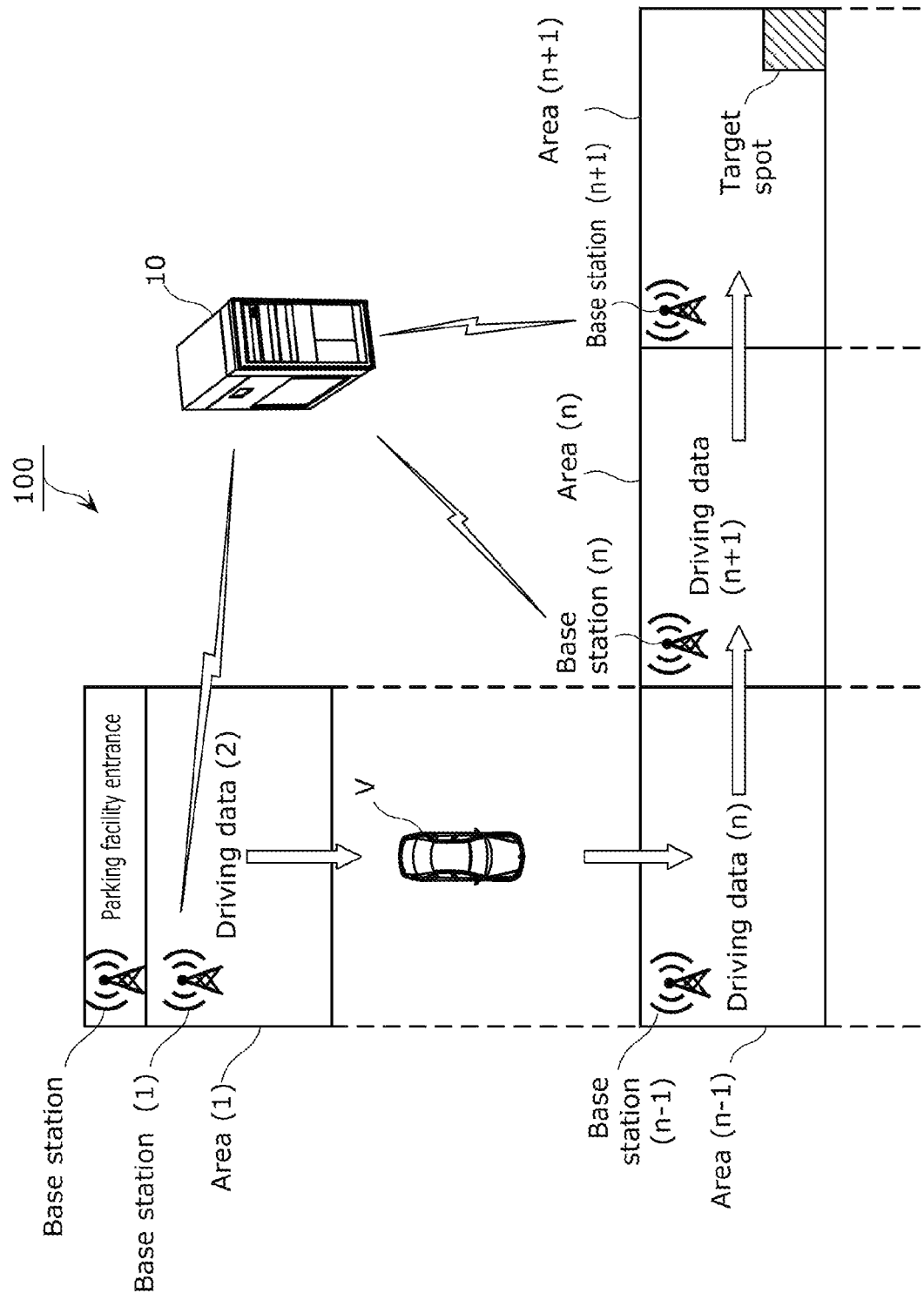
FIG. 1 is a diagram showing an example of a configuration of a vehicle driving management system according to an embodiment.

A management device according to one aspect of the present disclosure includes: a circuit; and at least one memory, wherein the circuit, in operation, in a case where a vehicle is to drive from a predetermined position to a target spot via a plurality of areas, generates driving data of each of the plurality of areas, the driving data indicating a driving path in the area and causing the vehicle to autonomously drive along the driving path; while the vehicle is driving in each of the plurality of areas, transmits driving data of an area next to the area to the vehicle via a base station of the area; and when driving data of a second area that is next to a first area that is one of the plurality of areas is not transmitted to the vehicle via a base station of the first area while the vehicle is autonomously driving in the first area, after the vehicle has driven back to a previous area where the vehicle was driving before driving into the first area, transmits driving data of a different area that is located at a position from the previous area to the target spot to the vehicle via a base station of the previous area.

With this configuration, for example, even if a failure occurs in the base station of the first area and the vehicle cannot receive the driving data of the second area, the vehicle can receive the driving data of the different area by driving back to the previous area. Accordingly, the vehicle can autonomously drive from the previous area to the target spot via the different area. That is, even if a failure or the like occurs in the base station, it is possible to cause the vehicle to appropriately drive to the target spot.

In the device disclosed in PTL 1 described above, for example, if a failure occurs in a base station, the vehicle cannot receive the data needed by the vehicle to drive through a coverage area next to the coverage area of the base station. As a result, a problem arises in that the vehicle cannot arrive at a parking space that is the target spot. On the other hand, with the management device according to one aspect of the present disclosure, it is possible to cause the vehicle to appropriately drive to the target spot.

Also, the circuit may transmit the driving data of the second area as the driving data of the different area.

With this configuration, the vehicle can autonomously drive from the previous area to the target spot via the first area and the second area.

Also, when there are two routes: a first route that is a route from the previous area to the target spot via the first area and the second area; and a second route that is a route from the previous area to the target spot via a third area that is different from the first area and the second area, the circuit may transmit driving data of the third area as the driving data of the different area.

With this configuration, the vehicle can autonomously drive from the previous area to the target spot along the second route.

Also, when the driving data of the second area is not transmitted to the vehicle while the vehicle is driving in the first area, and a following vehicle behind the vehicle is to drive in the first area and the second area via the previous area, the circuit may transmit driving data of the first area and the driving data of the second area to the following vehicle via the base station of the previous area while the following vehicle is driving in the previous area.

With this configuration, the following vehicle has already received the driving data of the second area when the following vehicle drives in the first area, and thus even if a failure occurs in the base station of the first area, the following vehicle can autonomously drive to the target spot via the first area and the second area without driving back to the previous area.

Also, when the driving data of the second area is not transmitted to the vehicle while the vehicle is driving in the first area, the circuit may further generate, for a following vehicle behind the vehicle, driving data of at least one area that is located on a route from the predetermined position to the target spot without passing through the first area.

With this configuration, if a failure occurs in the base station of the first area, the following vehicle can autonomously drive to the target spot without driving through the first area.

Also, a vehicle control device according to one aspect of the present disclosure is a vehicle control device that is mounted on a vehicle, the vehicle control device including: a circuit; and at least one memory, wherein the circuit, in operation, in a case where the vehicle is to drive from a predetermined position to a target spot via a plurality of areas, while the vehicle is driving in each of the plurality of areas, receives driving data that indicates a driving path in an area next to the area and is transmitted from a base station of the area; causes the vehicle to autonomously drive in each of the plurality of areas in accordance with the driving data of the area; when driving data of a second area that is next to a first area that is one of the plurality of areas is not received while the vehicle is autonomously driving in the first area, causes the vehicle to drive back to a previous area where the vehicle was driving before driving into the first area; and after the vehicle has driven back to the previous area, receives driving data of a different area that is located at a position from the previous area to the target spot, the driving data being transmitted from a base station of the previous area.

With this configuration, for example, if a failure occurs in the base station of the first area and the circuit does not receive the driving data of the second area, the vehicle is caused to drive back to the previous area, and thus the circuit can receive the driving data of the different area. Accordingly, the vehicle can autonomously drive from the previous area to the target spot via the different area. That is, even if a failure or the like occurs, it is possible to cause the vehicle to appropriately drive to the target spot.

Also, the circuit may receive the driving data of the second area as the driving data of the different area.

With this configuration, the vehicle can autonomously drive from the previous area to the target spot via the first area and the second area.

Also, when there are two routes: a first route that is a route from the previous area to the target spot via the first area and the second area; and a second route that is a route from the previous area to the target spot via a third area that is different from the first area and the second area, the circuit may receive driving data of the third area as the driving data of the different area.

With this configuration, the vehicle can autonomously drive from the previous area to the target spot along the second route.

General and specific aspects disclosed above may be implemented using a system, a method, an integrated circuit, a computer program, or a computer-readable recording medium such as a CD-ROM, or may be implemented using any combination of systems, methods, integrated circuits, computer programs, or computer-readable recording media.

Hereinafter, an embodiment will be described specifically with reference to the drawings.

The embodiment described below shows a generic and specific example of the present disclosure. The numerical values, shapes, materials, structural elements, the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements. In addition, the diagrams are schematic representations, and thus are not necessarily true to scale. Also, in the diagrams, structural elements that are the same are given the same reference numerals.

Embodiment

<System Configuration>

FIG. 1 is a diagram showing an example of a configuration of a vehicle driving management system according to an embodiment.

Vehicle driving management system 100 according to the present embodiment is a system that controls the autonomous driving of vehicle V in an automated valet parking environment, the system being configured to cause vehicle V to autonomously drive from a parking facility entrance to a parking space that is the target spot and then autonomously park in the parking space. Furthermore, vehicle driving management system 100 causes vehicle V that is parking in the parking space to autonomously drive to the parking facility entrance. Vehicle driving management system 100 described above includes a plurality of base stations, management device 10, and a vehicle control device that is mounted on vehicle V.

A parking facility includes an entrance and a plurality of areas. For example, the plurality of base stations are disposed in the plurality of areas in one to one correspondence. Each of the plurality of base stations transmits driving data to vehicle V that is driving in an area that is covered by the base station.

In the present embodiment, the plurality of areas are distinguished from each other by being represented by area (1), area (2), . . . , area (n−1), area (n), and area (n+1). Variable n in the parentheses is an integer of 1 or more. Likewise, the plurality of base stations are also distinguished from each other by being represented by base station (1), base station (2), . . . , base station (n−1), base station (n), and base station (n+1). The value and variable n in the parentheses show an association between an area and a base station. For example, base station (1) is associated with area (1) covered by base station (1), and transmits driving data to vehicle V that is driving in area (1). The same applies to other base stations. Also, the behaviors of vehicle V such as driving and parking in the parking facility are autonomous behaviors. As used herein, the term "autonomous behaviors" mean that vehicle V moves, drives or parks automatically, or in other words, without an operation of the driver. Hereinafter, autonomous driving and autonomous parking in the parking facility may also be referred to simply as driving and parking, respectively.

Management device 10 according to the present embodiment generates driving data of each area to cause vehicle V that has arrived at the parking facility entrance to autonomously drive to a parking space that is the target spot in the parking facility. For example, in the case where the parking space that is the target spot is located in area (n+1), management device 10 generates driving data (1) of area (1), driving data (2) of area (2), . . . , driving data (n−1) of area (n−1), driving data (n) of area (n), and driving data (n+1) of area (n+1). These driving data items are data items each indicating a driving path in the corresponding area of the driving data item.

At the parking facility entrance, vehicle V receives driving data (1) of area (1) transmitted from management device 10 via a base station disposed at the entrance, and starts driving autonomously in area (1) in accordance with driving data (1). Vehicle V receives driving data (2) of area (2) transmitted from management device 10 via base station (1) that covers area (1) while driving in area (1). That is, vehicle V receives the driving data of an area next to the area in which vehicle V is driving, before driving into the next area. Accordingly, when vehicle V has driven through area (1), vehicle V immediately starts driving in area (2) in accordance with driving data (2). In the same manner as described above, while vehicle V is driving in area (2), vehicle V receives driving data (3) of area (3) transmitted from management device 10 via base station (2) that covers area (2). By repeatedly receiving driving data and autonomously driving in accordance with the received driving data, vehicle V can arrive at and park in the parking space that is the target spot.

Figure 2:
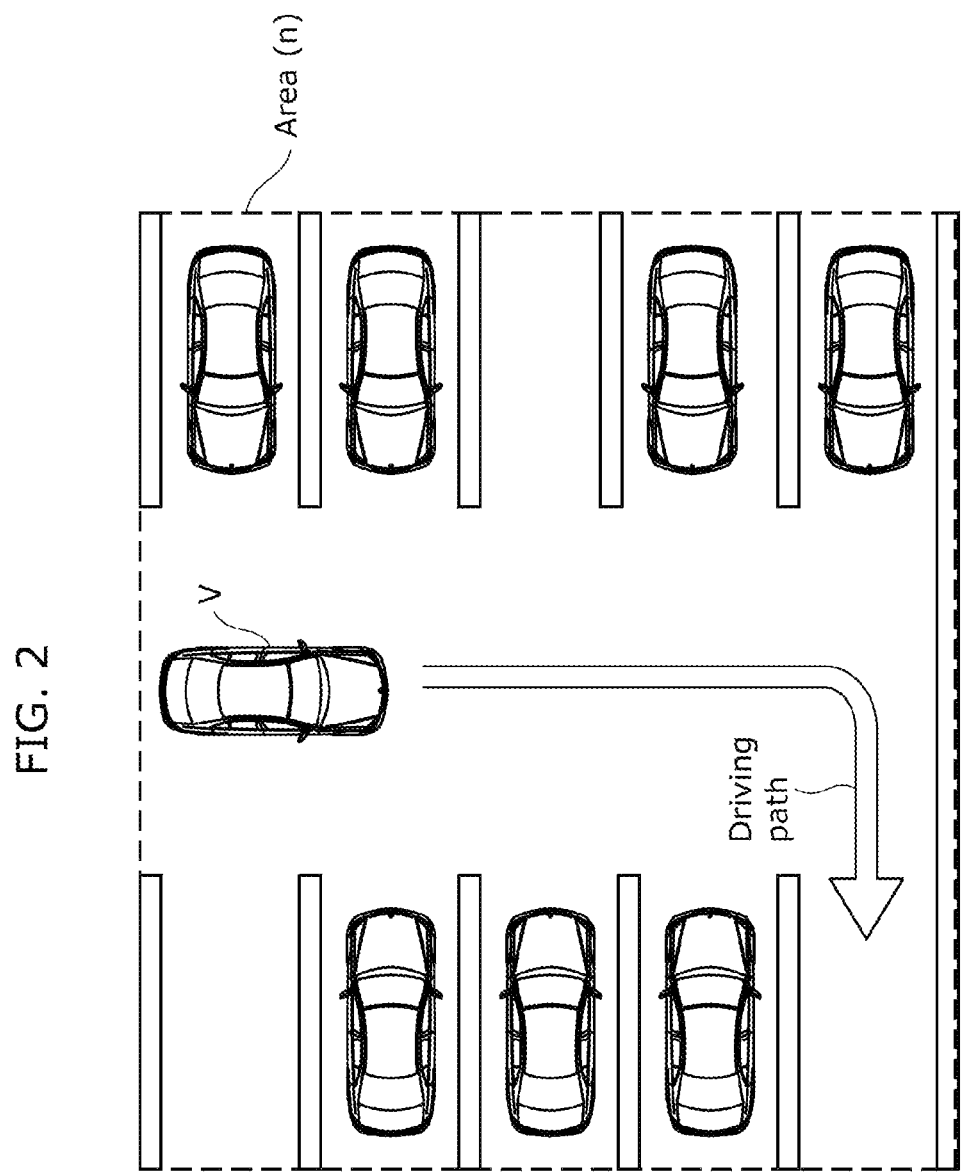
FIG. 2 is a diagram showing an example of an area included in a parking facility according to the embodiment.

FIG. 2 is a diagram showing an example of an area included in the parking facility.

For example, area (n) includes a plurality of parking spaces. In parking spaces determined by management device 10, vehicles are already parking. Vehicle V that is autonomously driving receives driving data (n) of area (n) transmitted from base station (n−1) while driving in area (n−1) that is an area before driving into area (n). Accordingly, vehicle V drives in accordance with the driving path indicated by driving data (n). Also, vehicle V receives driving data (n+1) of area (n+1) transmitted from base station (n) that covers area (n) while driving in area (n).

Figure 3:
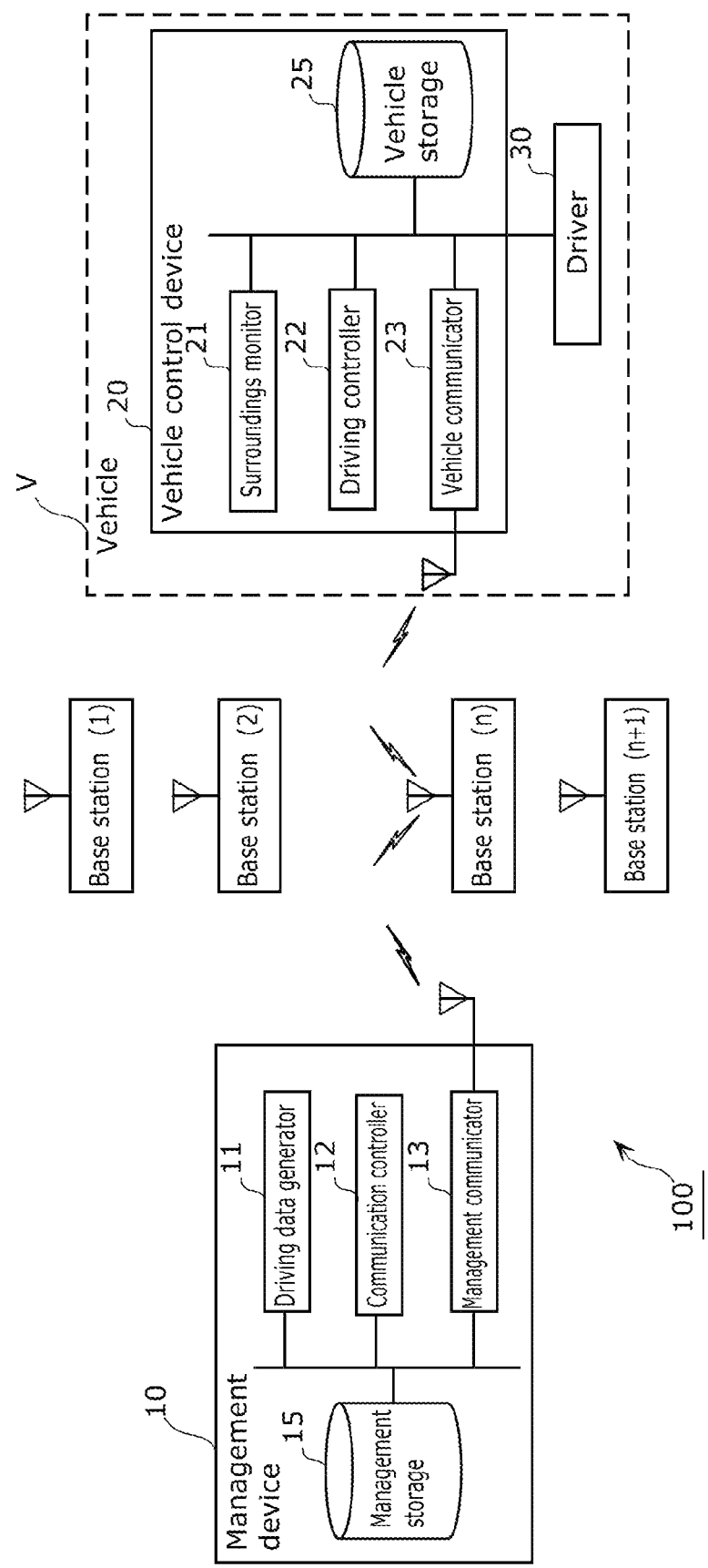
FIG. 3 is a block diagram showing a configuration example of a management device and a vehicle control device included in the vehicle driving management system according to the embodiment.

FIG. 3 is a block diagram showing a configuration example of management device 10 and vehicle control device 20 included in vehicle driving management system 100 according to the present embodiment.

Management device 10 includes driving data generator 11, communication controller 12, management communicator 13, and management storage 15.

Driving data generator 11 generates driving data for each area. Specifically, in the case where vehicle V is to drive from a predetermined position to a target spot via a plurality of areas, driving data generator 11 generates driving data of each of the plurality of areas. The generated driving data is data that indicates a driving path in the area and causes vehicle V to autonomously drive along the driving path. In the present embodiment, the predetermined position is the parking facility entrance. Then, driving data generator 11 stores each generated driving data in management storage 15.

Management storage 15 is a recording medium for storing the driving data generated by driving data generator 11. Management storage 15 may be, for example, a hard disk drive, a RAM (Random Access Memory), a ROM (Read Only Memory), a semiconductor memory, or the like. Management storage 15 may be volatile or non-volatile.

Management communicator 13 transmits the above-described driving data to vehicle V via a base station. The communication between management communicator 13 and each base station may be performed by using wired communication or wireless communication. Also, the communication between vehicle V and each base station is performed by using wireless communication. The wireless communication scheme may be Wi-Fi (registered trademark), Bluetooth (registered trademark), ZigBee, specified low-power radio communication scheme, or any other communication scheme.

While vehicle V is driving in each of the plurality of areas, communication controller 12 causes management communicator 13 to transmit the driving data of an area next to the area to vehicle V via the base station of the area. For example, while vehicle V is driving in area (n−1), communication controller 12 reads driving data (n) of area (n) from management storage 15. Then, communication controller 12 causes management communicator 13 to transmit driving data (n) of area (n) to vehicle V via base station (n−1) that covers area (n−1).

Vehicle control device 20 is a device mounted on vehicle V that includes driver 30, and includes surroundings monitor 21, driving controller 22, vehicle communicator 23, and vehicle storage 25. Driver 30 includes at least one actuator for driving or steering the wheels of vehicle V, and the at least one actuator may be, for example, a motor, an engine, or the like.

Surroundings monitor 21 is, for example, a camera or a sensor such as an ultrasonic sensor, and monitors the state of the surroundings to detect an obstacle or the like in the surroundings of the vehicle V Vehicle communicator 23 receives the driving data transmitted from management communicator 13 of management device 10 via a base station. Specifically, in the case where vehicle V drives from the parking facility entrance to the target spot via a plurality of areas, while vehicle V is driving in each of the plurality of areas, vehicle communicator 23 receives driving data that indicates a driving path in an area next to the area and is transmitted from the base station of the area. When vehicle communicator 23 receives the driving data, vehicle communicator 23 stores the driving data in vehicle storage 25. For example, while vehicle V is driving in area (n−1), vehicle communicator 23 receives driving data (n) of area (n) transmitted from base station (n−1) of area (n−1).

Vehicle storage 25 is a recording medium for storing the driving data received by vehicle communicator 23. Vehicle storage 25 may be, for example, a hard disk drive, a RAM (Random Access Memory), a ROM (Read Only Memory), a semiconductor memory, or the like. Vehicle storage 25 may be volatile or non-volatile.

Driving controller 22 controls driver 30 to cause vehicle V to autonomously drive in each of the plurality of areas in accordance with the driving data of the area. That is, driving controller 22 controls driver 30 such that vehicle V drives along the driving path indicated by the driving data. At this time, driving controller 22 causes vehicle V to autonomously drive while preventing vehicle V from coming into contact with an obstacle or the like detected by surroundings monitor 21.

Figure 4:
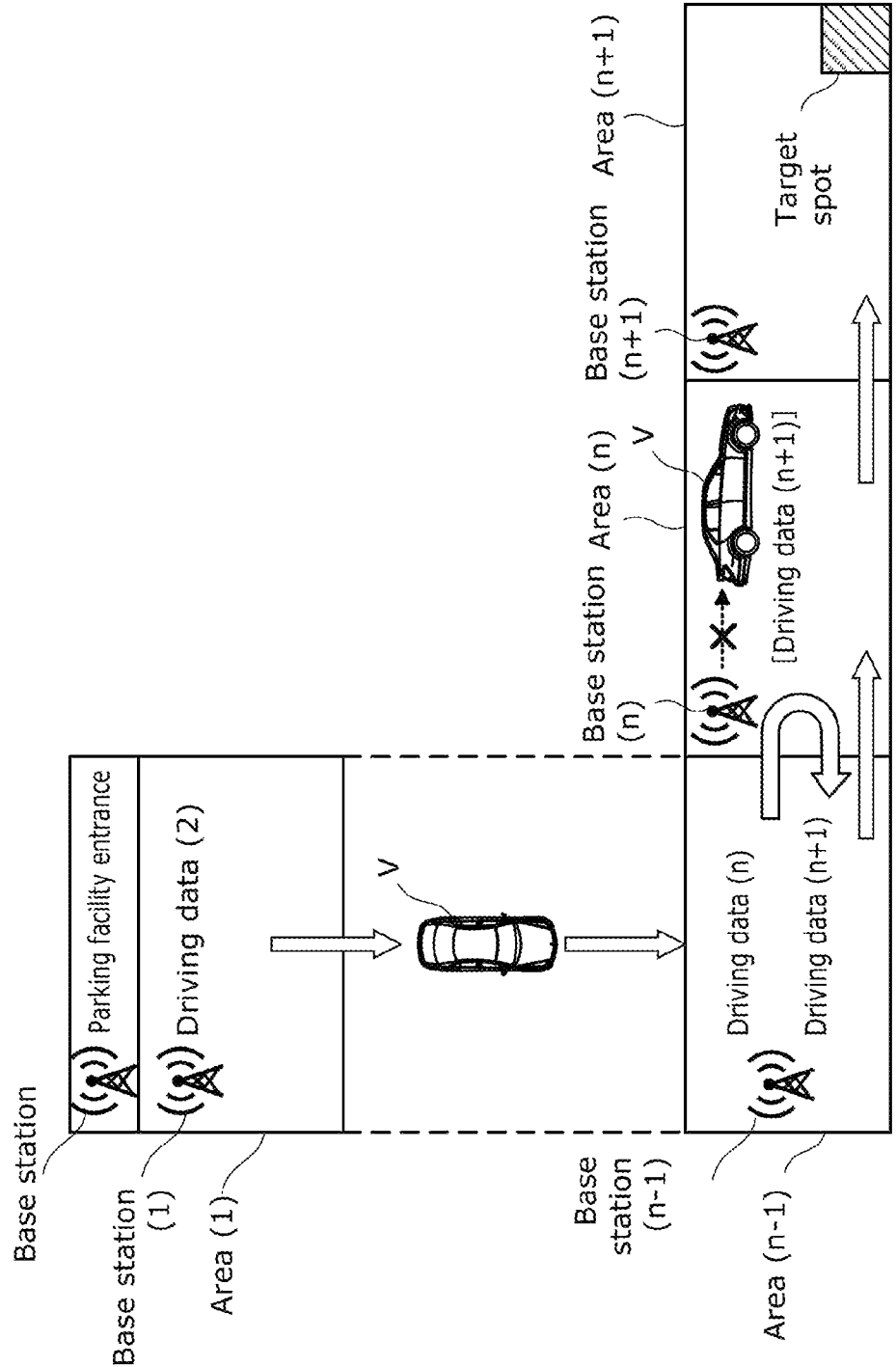
FIG. 4 is a diagram illustrating a processing operation performed by the vehicle driving management system according to the embodiment.

FIG. 4 is a diagram illustrating a processing operation performed by vehicle driving management system 100 according to the present embodiment.

For example, when vehicle V autonomously drives from area (n−2) to area (n−1), at this time, driving controller 22 of vehicle control device 20 detects the entry of vehicle V into area (n−1) based on the result of monitoring performed by surroundings monitor 21 and driving data (n−1) of area (n−1). Then, driving controller 22 controls driver 30 to cause vehicle V to start autonomous driving in area (n−1) in accordance with driving data (n−1). That is, driving controller 22 causes vehicle V to start driving along the driving path indicated by driving data (n−1). Furthermore, at this time, driving controller 22 causes vehicle communicator 23 to transmit a request signal for requesting driving data. The request signal is a signal for requesting the driving data of an area next to area (n−1), and is transmitted to management device 10 via base station (n−1) of area (n−1).

Management communicator 13 of management device 10 receives the request signal from vehicle V via base station (n−1). When the request signal is received, communication controller 12 reads driving data (n) of area (n) that is the area next to area (n−1) from management storage 15. Then, communication controller 12 causes management communicator 13 to transmit driving data (n) to vehicle V via base station (n−1).

Vehicle communicator 23 of vehicle control device 20 receives driving data (n) transmitted from management device 10 via base station (n−1) while vehicle V is autonomously driving in area (n−1). When driving data (n) is received, driving controller 22 stores driving data (n) in vehicle storage 25.

Next, vehicle V drives into area (n) from area (n−1). At this time as well, in the same manner as described above, driving controller 22 of vehicle control device 20 detects the entry of vehicle V into area (n) based on the result of monitoring performed by surroundings monitor 21 and driving data (n) of area (n). Then, driving controller 22 controls driver 30 to cause vehicle V to autonomously drive in area (n) in accordance with driving data (n). That is, driving controller 22 causes vehicle V to start driving along the driving path indicated by driving data (n). Furthermore, at this time as well, driving controller 22 causes vehicle communicator 23 to transmit a request signal for requesting driving data. The request signal is a signal for requesting the driving data of an area next to area (n), and is transmitted to management device 10 via base station (n) of area (n).

Management communicator 13 of management device 10 receives the request signal from vehicle V via base station (n). When the request signal is received, communication controller 12 reads driving data (n+1) of area (n+1) that is the area next to area (n) from management storage 15. Then, communication controller 12 causes management communicator 13 to transmit driving data (n+1) to vehicle V via base station (n).

However, if a failure occurs in base station (n), driving data (n+1) is not transmitted from base station (n) to vehicle V. In this case, because driving data (n+1) is not received by vehicle communicator 23, driving controller 22 of vehicle control device 20 according to the present embodiment determines whether a failure has occurred in base station (n). Then, if it is determined that a failure has occurred in base station (n), driving controller 22 controls driver 30 to cause vehicle V to drive, for example, in an opposite direction along the driving path indicated by driving data (n). As a result, vehicle V drives back to area (n−1). At this time, driving controller 22 detects, based on the result of monitoring performed by surroundings monitor 21 and driving data (n−1) of area (n−1), that vehicle V has driven back to area (n−1). Then, driving controller 22 causes vehicle communicator 23 to transmit a request signal. The request signal is a signal for requesting the driving data of an area next to area (n), and is transmitted to management device 10 via base station (n−1) of area (n−1).

Management communicator 13 of management device 10 receives the request signal from vehicle V via base station (n−1). When the request signal is received, communication controller 12 reads driving data (n+1) of area (n+1) that is an area next to area (n) from management storage 15. Then, communication controller 12 causes management communicator 13 to transmit driving data (n+1) to vehicle V via base station (n−1).

Vehicle communicator 23 of vehicle control device 20 receives driving data (n+1) transmitted from management device 10 via base station (n−1) while vehicle V is driving back to area (n−1). When driving data (n+1) is received, driving controller 22 stores driving data (n+1) in vehicle storage 25. As a result, driving data (n) and driving data (n+1) are stored in vehicle storage 25. Then, driving controller 22 controls driver 30 to cause vehicle V to drive into area (n) from area (n−1), and also controls driver 30 to cause vehicle V to drive in accordance with driving data (n) and driving data (n+1). With this configuration, vehicle V drives from area (n−1) to area (n) and further drives to area (n+1). Then, vehicle V parks in a parking space that is the target spot.

As described above, there is a case where the driving data of a second area that is next to a first area that is one of the plurality of area is not transmitted from management communicator 13 of management device 10 to vehicle V via a base station that covers the first area while vehicle V is autonomously driving in the first area. In other words, there is a case where the driving data of the second area that is next to the first area is not received by vehicle communicator 23 of vehicle control device 20 while vehicle V is driving in the first area that is one of the plurality of areas. For example, there is a case where the driving data of the second area is not transmitted to vehicle V due to the occurrence of a failure in the base station of the first area, and thus the driving data is not received by vehicle communicator 23 of vehicle V. In the example shown in FIG. 4, area (n) corresponds to the first area, and area (n+1) corresponds to the second area.

To address this, driving controller 22 of vehicle control device 20 controls driver 30 to cause vehicle V to drive back to a previous area where vehicle V was driving before driving into the first area. Then, when vehicle V has moved back to the previous area where vehicle V was driving before driving into the first area, communication controller 12 of management device 10 causes management communicator 13 to transmit the driving data of a different area that is located at a position from the previous area to the target spot to vehicle V via a base station that covers the previous area. As a result, when vehicle V has moved back to the previous area, vehicle communicator 23 of vehicle control device 20 receives the driving data of the different area that is located at a position from the previous area to the target spot, the driving data being transmitted from the base station of the previous area. In the example shown in FIG. 4, area (n−1) corresponds to the previous area.

In the present embodiment, communication controller 12 of management device 10 causes management communicator 13 to transmit the driving data of the second area as the driving data of the different area. Then, vehicle communicator 23 of vehicle control device 20 receives the driving data of the second area as the driving data of the different area. In the example shown in FIG. 4, area (n+1) corresponds to the different area and the second area.

With this configuration, even if a failure occurs in base station (n) of area (n) and vehicle V cannot receive driving data (n+1) of area (n+1) from base station (n), as a result of vehicle V driving back to area (n−1), vehicle V can receive driving data (n+1) of area (n+1). Accordingly, vehicle V can autonomously drive from area (n−1) to the target spot via area (n) and area (n+1). That is, even if a failure or the like occurs, it is possible to cause vehicle V to appropriately drive to the target spot.

Figure 5:
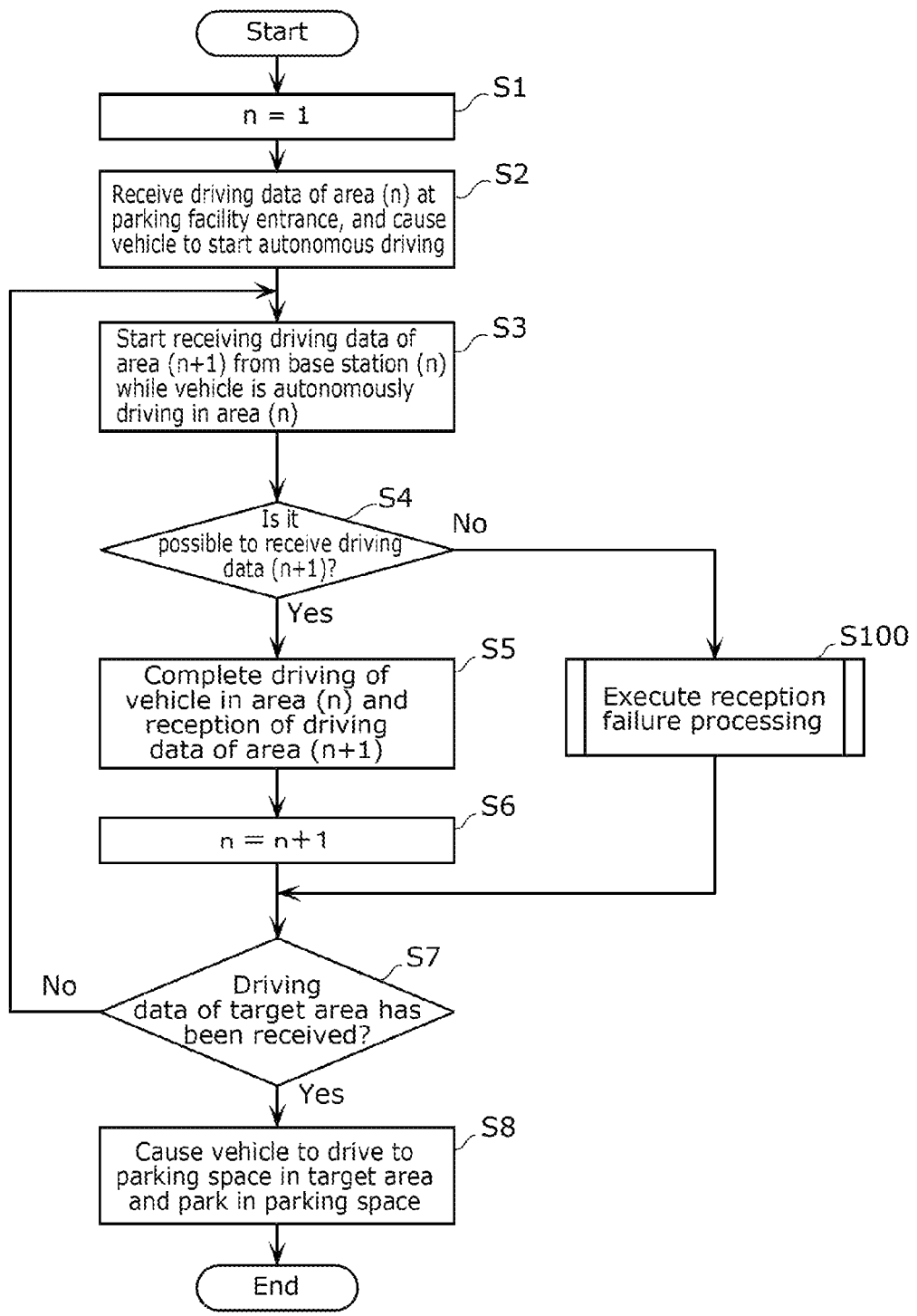
FIG. 5 is a flowchart showing an example of an overall processing operation performed by the vehicle control device according to the embodiment.

FIG. 5 is a flowchart showing an example of an overall processing operation performed by vehicle control device 20.

When vehicle V arrives at the parking facility entrance, driving controller 22 of vehicle control device 20 first initializes variable n to 1 (step S1). Then, vehicle communicator 23 receives driving data (n) of area (n) at the parking facility entrance. For example, vehicle communicator 23 receives driving data (n) from management device 10 via the base station disposed at the entrance. When driving data (n) has been received, driving controller 22 controls driver 30 to cause vehicle V to start autonomous driving (step S2). At this time, driving controller 22 may cause vehicle V to start autonomous driving when a driving start signal transmitted from management device 10 is received by vehicle communicator 23. The driving start signal is a signal that instructs vehicle V to start autonomous driving.

Next, driving controller 22 causes vehicle communicator 23 to start receiving driving data (n+1) of area (n+1) from base station (n) while vehicle V is autonomously driving in area (n) (step S3). At this time, driving controller 22 may cause vehicle communicator 23 to receive driving data (n+1) by causing vehicle communicator 23 to transmit a request signal as described above to management device 10.

Here, driving controller 22 determines whether it is possible to receive driving data (n+1) (step S4). If, for example, driving data (n+1) is not received by vehicle communicator 23 within a predetermined period of time, or it is not possible to receive the entire driving data (n+1), driving controller 22 determines that it is not possible to receive driving data (n+1).

If it is determined that it is not possible to receive driving data (n+1) (No in step S4), driving controller 22 executes reception failure processing (step S100). On the other hand, if it is determined that it is possible to receive driving data (n+1) (Yes in step S4), driving controller 22 controls driver 30 and vehicle communicator 23 to complete the driving of vehicle V in area (n) and the reception of driving data (n+1) of area (n+1) (step S5). Driving controller 22 may, when the reception of driving data (n+1) is completed, cause vehicle communicator 23 to transmit a reception completion signal that indicates that driving data (n+1) has been received to management device 10 via base station (n). Then, driving controller 22 increments variable n (step S6).

Next, after the processing in step S6 or step S100, driving controller 22 determines whether the driving data of the target area has been received (step S7). As used herein, the term "target area" refers to an area in which the parking space that is the target spot is located. That is, driving controller 22 determines whether driving data (n+1) received in step S5 is the driving data of the target area. If it is determined that the driving data of the target area has not been received (No in step S7), driving controller 22 repeatedly performs the processing from step S3. On the other hand, if it is determined that the driving data of the target area has been received (Yes in step S7), driving controller 22 controls driver 30 to cause vehicle V to drive to the parking space in the target area and park in the parking space (step S8).

Figure 6:
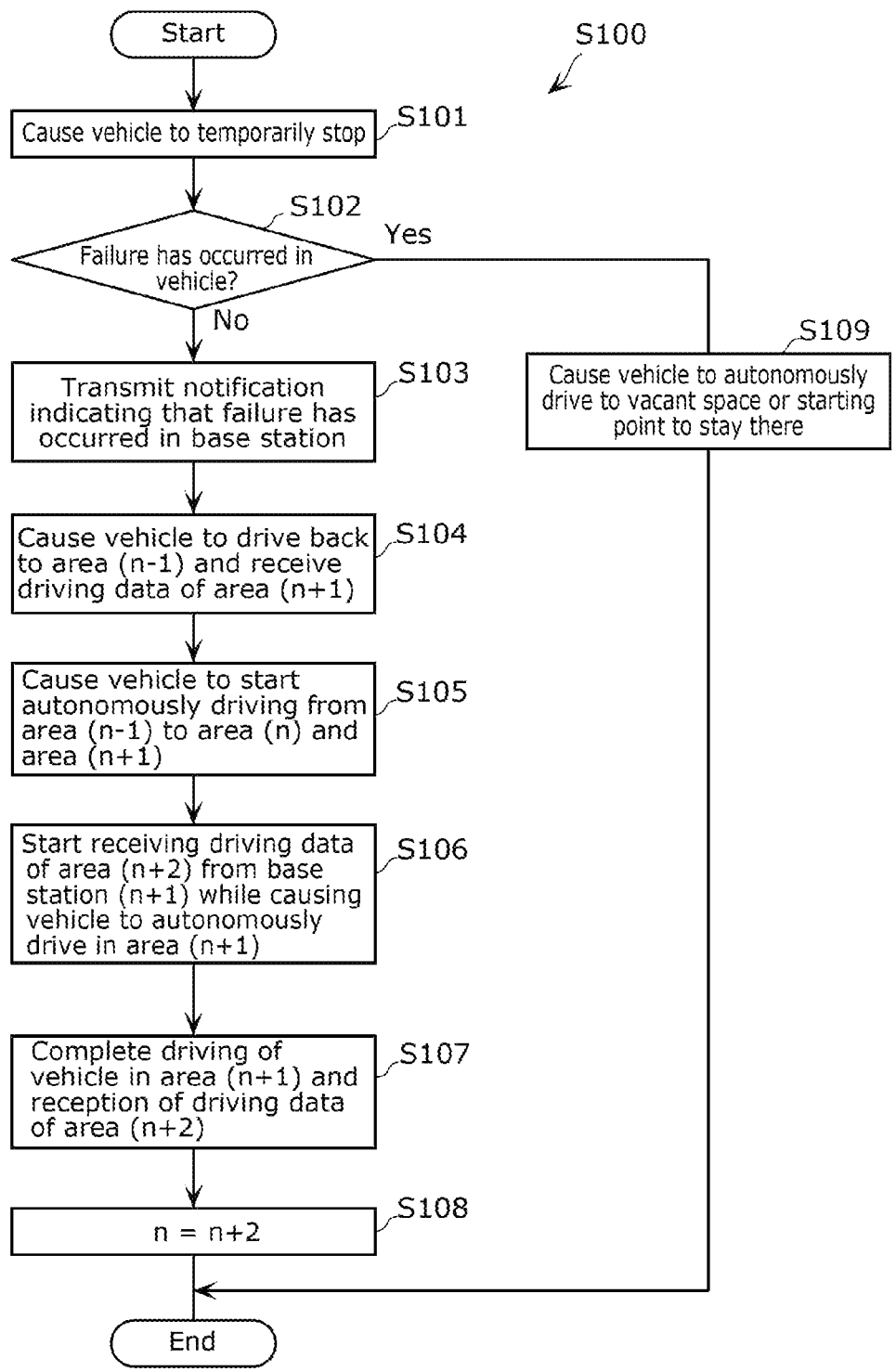
FIG. 6 is a flowchart showing an example of reception failure processing performed by the vehicle control device according to the embodiment.

FIG. 6 is a flowchart showing an example of reception failure processing performed by vehicle control device 20. That is, FIG. 6 is a flowchart showing a detailed processing operation performed in step S100 shown in FIG. 5.

First, driving controller 22 controls driver 30 to cause vehicle V to temporarily stop (step S101). Then, driving controller 22 determines whether the cause of not receiving driving data (n+1) is a failure in vehicle V, or in other words, whether a failure has occurred in vehicle communicator 23 of vehicle V (step S102). For example, driving controller 22 compares a reception result of another communication means included in vehicle control device 20 with a reception result of vehicle communicator 23. If the reception results do not match, driving controller 22 determines that a failure has occurred in vehicle communicator 23.

Here, if it is determined that a failure has occurred in vehicle communicator 23 and not in base station (n) (Yes in step S102), driving controller 22 controls driver 30 to cause vehicle V to autonomously drive by using driving data (1) to driving data (n) that are stored in vehicle storage 25. Then, driving controller 22 causes vehicle V to temporarily drive into and stay at a vacant space in any one of area (1) to area (n). Alternatively, driving controller 22 causes vehicle V to drive back to the parking facility entrance and temporarily stay at the entrance (step S109). At this time, management device 10 can recognize the failure in vehicle V by not receiving a communication response from vehicle V, for example, by not receiving a reception completion signal as described above from vehicle V. Also, in the example described above, driving controller 22 causes vehicle V to temporarily drive into and stay at a vacant space or the like when it is determined that a failure has occurred in vehicle communicator 23. However, even if it is determined that a failure has not occurred in vehicle V, driving controller 22 may cause vehicle V to temporarily drive into and stay at a vacant space or the like if a failure occurs in vehicle driving management system 100. Then, after the processing in step S109, driving controller 22 ends the reception failure processing, and prohibits the processing in step S7 and the subsequent step shown in FIG. 5 from being performed.

As described above, in the present embodiment, if a failure occurs in the driving data reception function of vehicle control device 20, vehicle V is caused to temporarily drive into and stay at a vacant space or the like, and it is therefore possible to prevent vehicle V from becoming an obstacle that interferes with the driving of other vehicles.

Next, if it is determined in step S102 that a failure has not occurred in vehicle communicator 23 of vehicle V (No in step S102), driving controller 22 determines that a failure has occurred in base station (n). Then, driving controller 22 transmits a notification indicating that a failure has occurred in base station (n) to management device 10 (step S103). For example, vehicle communicator 23 transmits a notification signal indicating that a failure has occurred in the driving data transmission function of base station (n) to management device 10 via base station (n), another base station, or another relay.

Next, driving controller 22 controls driver 30 to cause vehicle V to drive back to area (n−1) and cause vehicle communicator 23 to receive driving data (n+1) of area (n+1) that was not received in area (n) (step S104). At this time, driving controller 22 may cause vehicle communicator 23 to start receiving driving data (n+1) by causing vehicle communicator 23 to transmit a request signal as described above to management device 10. Then, driving controller 22 controls driver 30 to cause vehicle V to start autonomously driving from area (n−1) to area (n) and area (n+1) (step S105).

Next, driving controller 22 causes vehicle communicator 23 to start receiving driving data (n+2) of area (n+2) transmitted from base station (n+1) while causing vehicle V to autonomously drive in area (n+1) (step S106). At this time as well, driving controller 22 may cause vehicle communicator 23 to start receiving driving data (n+2) by causing vehicle communicator 23 to transmit a request signal as described above to management device 10. Then, driving controller 22 controls driver 30 and vehicle communicator 23 to complete the driving of vehicle V in area (n+1) and the reception of driving data (n+2) of area (n+2) (step S107). After that, driving controller 22 increments variable n by 2 (step S108), and ends the reception failure processing.

In the example shown in FIG. 6, a notification indicating that a failure has occurred in base station (n) is transmitted before vehicle V drives back to area (n−1), but may be transmitted when vehicle V has driven back to area (n−1). In this case, vehicle communicator 23 transmits a notification signal indicating that a failure has occurred in the driving data transmission function of base station (n) to management device 10 via base station (n−1).

Figure 7:
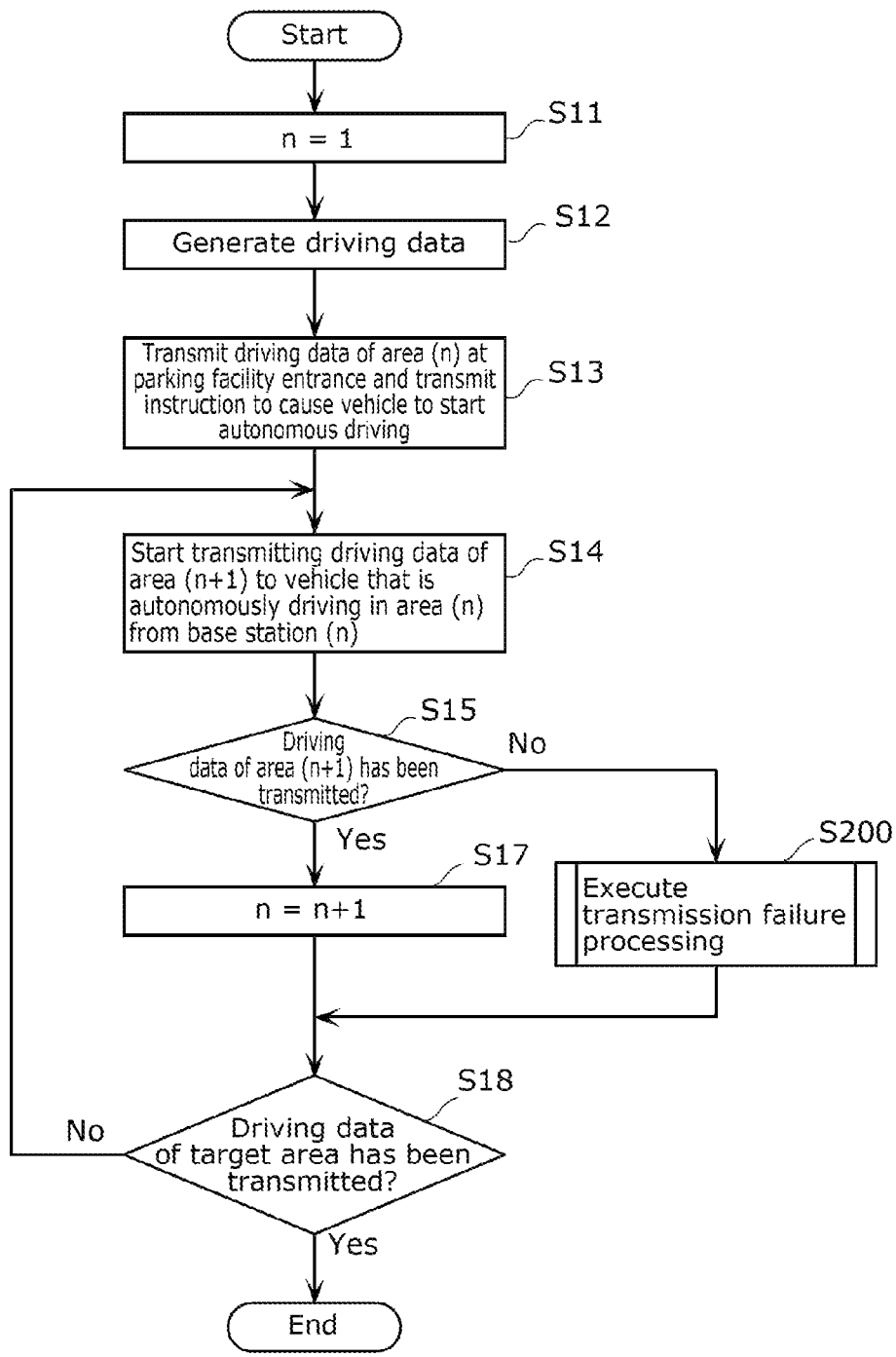
FIG. 7 is a flowchart showing an example of an overall processing operation performed by the management device according to the embodiment.

FIG. 7 is a flowchart showing an example of an overall processing operation performed by management device 10.

First, when vehicle V arrives at the parking facility entrance, communication controller 12 of management device 10 first initializes variable n to 1 (step S11). Then, driving data generator 11 generates driving data for each of the areas that are located from the entrance to a parking space that is the target spot (step S12). Then, at the parking facility entrance, management communicator 13 transmits driving data (n) of area (n) to vehicle V via the base station disposed at the entrance. When driving data (n) has been transmitted, communication controller 12 transmits, to vehicle control device 20 of vehicle V, an instruction to start autonomous driving (step S13). The instruction to start autonomous driving is transmitted as a result of, for example, management communicator 13 transmitting a driving start signal to vehicle control device 20.

Next, management communicator 13 starts transmitting driving data (n+1) of area (n+1) to vehicle V that is autonomously driving in area (n) in response to control performed by communication controller 12 (step S14). Driving data (n+1) is transmitted via base station (n). Communication controller 12 may cause management communicator 13 to start transmitting driving data (n+1) when a request signal as described above transmitted from vehicle communicator 23 has been received by management communicator 13.

Then, communication controller 12 determines whether driving data (n+1) of area (n+1) has been transmitted (step S15). If, for example, a reception completion signal described above transmitted from vehicle V is received by management communicator 13 within a predetermined period of time from the start of transmission of driving data (n+1), communication controller 12 determines that driving data (n+1) of area (n+1) has been transmitted. Here, if it is determined that driving data (n+1) of area (n+1) has not been transmitted (No in step S15), communication controller 12 executes transmission failure processing (step S200). On the other hand, if it is determined that driving data (n+1) of area (n+1) has been transmitted (Yes in step S15), communication controller 12 increments variable n (step S17).

Then, after the processing in step S17 and step S200, communication controller 12 determines whether the driving data of a target area has been transmitted (step S18). The target area is an area in which the parking space that is the target spot is located. That is, communication controller 12 determines whether driving data (n+1) that was determined in step S15 as having been transmitted is the driving data of the target area. If it is determined that the driving data of the target area has not been transmitted (No in step S18), communication controller 12 repeatedly executes the processing from step S14. On the other hand, if it is determined that the driving data of the target area has been transmitted (Yes in step S18), communication controller 12 ends the transmission of driving data to vehicle V.

Figure 8:
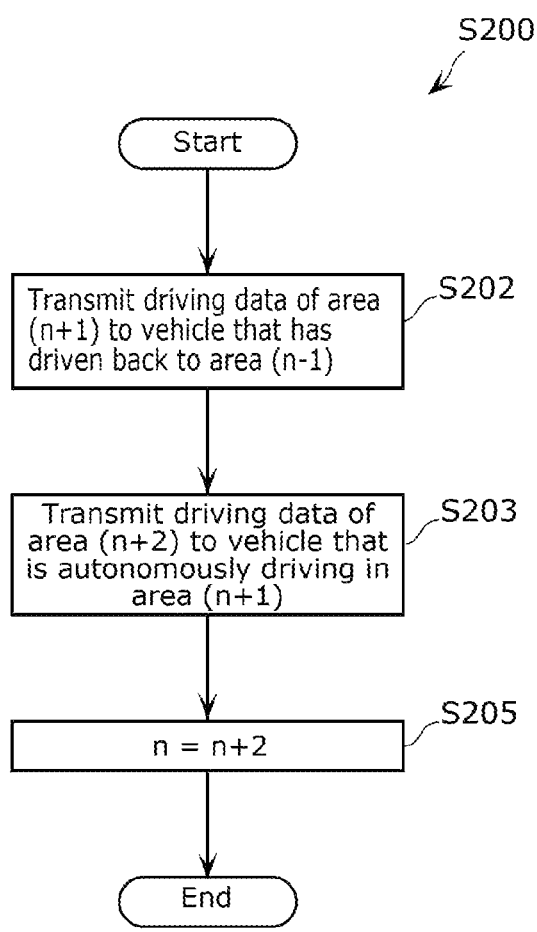
FIG. 8 is a flowchart showing an example of transmission failure processing performed by the management device according to the embodiment.

FIG. 8 is a flowchart showing an example of the transmission failure processing performed by management device 10. That is, FIG. 8 is a flowchart showing a detailed processing operation performed in step S200 shown in FIG. 7.

First, communication controller 12 causes management communicator 13 to transmit driving data (n+1) to vehicle V that has driven back to area (n−1) via base station (n−1) (step S202). Driving data (n+1) is the driving data of area (n+1) that was not transmitted in area (n). Communication controller 12 may cause management communicator 13 to start transmitting driving data (n+1) when a request signal as described above transmitted from vehicle communicator 23 is received by management communicator 13.

Next, communication controller 12 causes management communicator 13 to transmit driving data (n+2) of area (n+2) to vehicle V that is driving in area (n+1) via base station (n+1) (step S203). In step S203 as well, communication controller 12 may cause management communicator 13 to start transmitting driving data (n+2) when a request signal as described above transmitted from vehicle communicator 23 is received by management communicator 13. Then, communication controller 12 increments variable n by 2 (step S205), and ends the transmission failure processing.

As described above, in the present embodiment, if a failure occurs in base station (n) of area (n), and vehicle control device 20 cannot receive driving data (n+1) of area (n+1) from base station (n), vehicle V is caused to drive back to area (n−1). Then, vehicle communicator 23 receives driving data (n+1) of area (n+1) from base station (n−1) of area (n−1). Accordingly, vehicle V can autonomously drive from area (n−1) to the target spot via area (n) and area (n+1). That is, even if a failure or the like occurs, it is possible to cause vehicle V to appropriately drive to the target spot.

Also, in the present embodiment, as described above, if a failure occurs in the driving data reception function of vehicle control device 20, vehicle V is caused to temporarily drive into and stay at a vacant space or the like, and it is therefore possible to prevent vehicle V from becoming an obstacle that interferes with the driving of other vehicles.

Also, when driving data (n+1) is not transmitted from base station (n) while vehicle V is in area (n), management device 10 according to the present embodiment may cause base station (n−1) of area (n−1) to transmit not only driving data (n) but also driving data (n+1). That is, if a failure occurs in base station (n), management device 10 causes base station (n−1) to transmit driving data (n) and driving data (n+1) to a following vehicle that is driving from area (n−1) to area (n) and area (n+1) until the failure is fixed.

In other words, when the driving data of a second area is not transmitted to vehicle V while vehicle V is driving in a first area, and a following vehicle behind vehicle V is to drive in the first area and the second area via the previous area, communication controller 12 causes management communicator 13 to transmit the driving data of the first area and the driving data of the second area to the following vehicle via the base station of the previous area while the following vehicle is driving in the previous area. In the example shown in FIG. 4, area (n−1), area (n), and area (n+1) respectively correspond to the previous area, the first area, and the second area.

With this configuration, the following vehicle has already received the driving data of the second area when the following vehicle drives in the first area, and thus even if a failure occurs in the base station of the first area, the following vehicle can autonomously drive to the target spot via the first area and the second area without driving back to the previous area.

(Variation)

In the embodiment given above, when vehicle V cannot receive the driving data of the second area that is next to the first area while driving in the first area, vehicle V drives back to the previous area to receive the driving data of the second area. On the other hand, according to the present variation, vehicle V receives the driving data of a third area instead of the driving data of the second area. The third area is not an area located on the route from the previous area to the target spot via the first area and the second area, but is an area located on a different route from the previous area to the target spot. That is, in the present variation, when vehicle V cannot receive the driving data of the second area, vehicle V receives the driving data of an area located on a different route and autonomously drives to the target spot along the different route.

Figure 9:
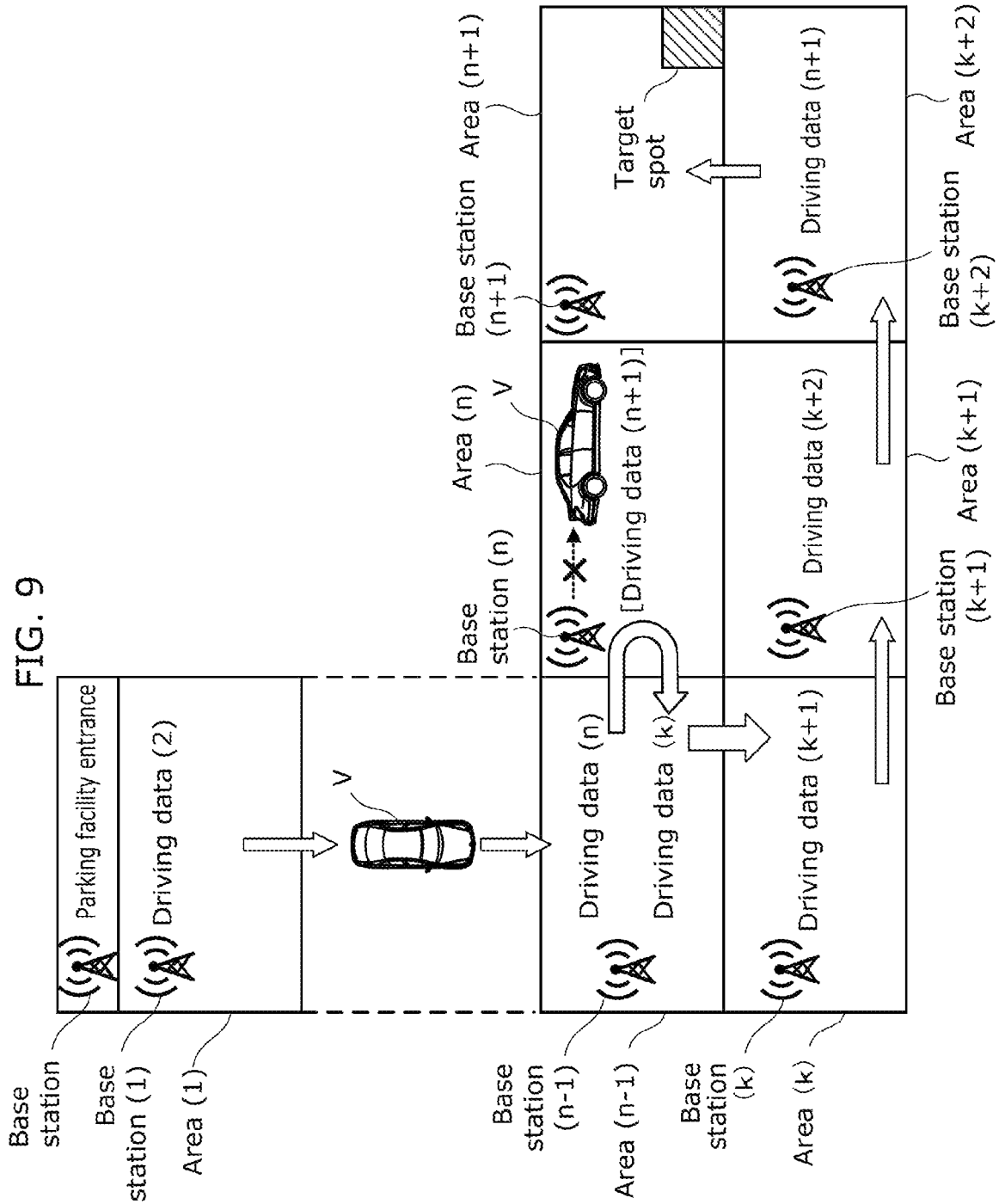
FIG. 9 is a diagram illustrating a processing operation performed by a vehicle driving management system according to a variation of the embodiment.

FIG. 9 is a diagram illustrating a processing operation performed by vehicle driving management system 100 according to the present variation. Vehicle driving management system 100 according to the present variation has the same configuration as that of embodiment described above.

For example, in the present variation as well, as in the embodiment given above, if a failure occurs in base station (n) of area (n), driving data (n+1) is not transmitted from base station (n) to vehicle V. In this case, in the present variation as well, because driving data (n+1) is not received by vehicle communicator 23, driving controller 22 of vehicle control device 20 determines whether a failure has occurred in base station (n). If it is determined that a failure has occurred in base station (n), driving controller 22 controls driver 30 to cause vehicle V to drive in an opposite direction along the driving path indicated by driving data (n). At this time, vehicle V drives back to area (n−1). At this time, driving controller 22 detects, based on the result of monitoring performed by surroundings monitor 21 and driving data (n−1) of area (n−1), that vehicle V has driven back to area (n−1). Then, driving controller 22 causes vehicle communicator 23 to transmit a request signal. The request signal is a signal for requesting the driving data of an area next to area (n), and is transmitted to management device 10 via base station (n−1) of area (n−1).

Management communicator 13 of management device 10 according to the present variation receives the request signal from vehicle V via base station (n−1). When the request signal is received, communication controller 12 generates driving data (k) of area (k) that is located on a different route, instead of driving data (n+1) of area (n+1) that is the next area to area (n). Variable k in the parentheses is an integer of 1 or more. That is, driving data (k) of area (k) that is located on a second route that is a route different from a first route from area (n−1) to the target spot via area (n) and area (n+1) is generated. The second route is a route from area (n−1) to the target spot via area (k), area (k+1), area (k+2), and area (n+1). Then, communication controller 12 causes management communicator 13 to transmit driving data (k) to vehicle V via base station (n−1).

After that, communication controller 12 causes management communicator 13 to transmit driving data (k+1) of area (k+1) that is the next area via base station (k) while vehicle V is driving in area (k). Furthermore, communication controller 12 causes management communicator 13 to transmit driving data (k+2) of area (k+2) that is the next area via base station (k+1) while vehicle V is driving in area (k+1). Furthermore, communication controller 12 causes management communicator 13 to transmit driving data (n+1) of area (n+1) that is the next area via base station (k+2) while vehicle V is driving in area (k+2).

Vehicle communicator 23 of vehicle control device 20 receives driving data (k) transmitted from management device 10 via base station (n−1) while vehicle V is driving back to area (n−1). When driving data (k) is received, driving controller 22 stores driving data (k) in vehicle storage 25. Then, driving controller 22 controls driver 30 to cause vehicle V to drive into area (k) from area (n−1), and also controls driver 30 in accordance with driving data (k) to cause vehicle V to drive through area (k).

After that, vehicle communicator 23 receives driving data (k+1) of area (k+1) that is the next area from management device 10 via base station (k) while vehicle V is driving in area (k). Accordingly, driving controller 22 controls driver 30 in accordance with driving data (k+1) to cause vehicle V to drive into area (k+1). Furthermore, vehicle communicator 23 receives driving data (k+2) of area (k+2) that is the next area from management device 10 via base station (k+1) while vehicle V is driving in area (k+1). Accordingly, driving controller 22 controls driver 30 in accordance with driving data (k+2) to cause vehicle V to drive into area (k+2). Furthermore, vehicle communicator 23 receives driving data (n+1) of area (n+1) that is the next area from management device 10 via base station (k+2) while vehicle V is driving in area (k+2). Accordingly, driving controller 22 controls driver 30 in accordance with driving data (n+1) to cause vehicle V to drive into area (n+1). In this way, vehicle V parks in a parking space that is the target spot.

Communication controller 12 of management device 10 may cause management communicator 13 to also transmit new driving data (n−1) indicating a driving path from area (n−1) to area (k) to vehicle V via base station (n−1) while vehicle V is driving back to area (n−1). With this configuration, driving controller 22 of vehicle control device 20 can cause vehicle V to autonomously drive in area (n−1) as appropriate in accordance with new driving data (n−1) so as to drive toward area (k).

As described above, in the present variation, in the case where there are two routes: a first route that is a route from the previous area to the target spot via a first area and a second area; and a second route that is a route from the previous area to the target spot via a third area that is different from the first area and the second area, communication controller 12 of management device 10 causes management communicator 13 to transmit the driving data of the third area as the driving data of a different area. On the other hand, in the case where there are two routes: a first route that is a route from the previous area to the target spot via a first area and a second area; and a second route that is a route from the previous area to the target spot via a third area that is different from the first area and the second area, vehicle communicator 23 of vehicle control device 20 receives the driving data of the third area as the driving data of a different area. In the example shown in FIG. 9, area (n−1), area (n), area (n+1), and area (k) respectively correspond to the previous area, the first area, the second area, and the third area.

With this configuration, vehicle V can autonomously drive from the previous area to the target spot along the second route as appropriate.

Vehicle control device 20 according to the present variation performs the same processing operation as the processing operation of the embodiment described above shown in FIG. 5, except that the reception failure processing in step S100 is performed in a manner different from that of the embodiment described above.

Figure 10:
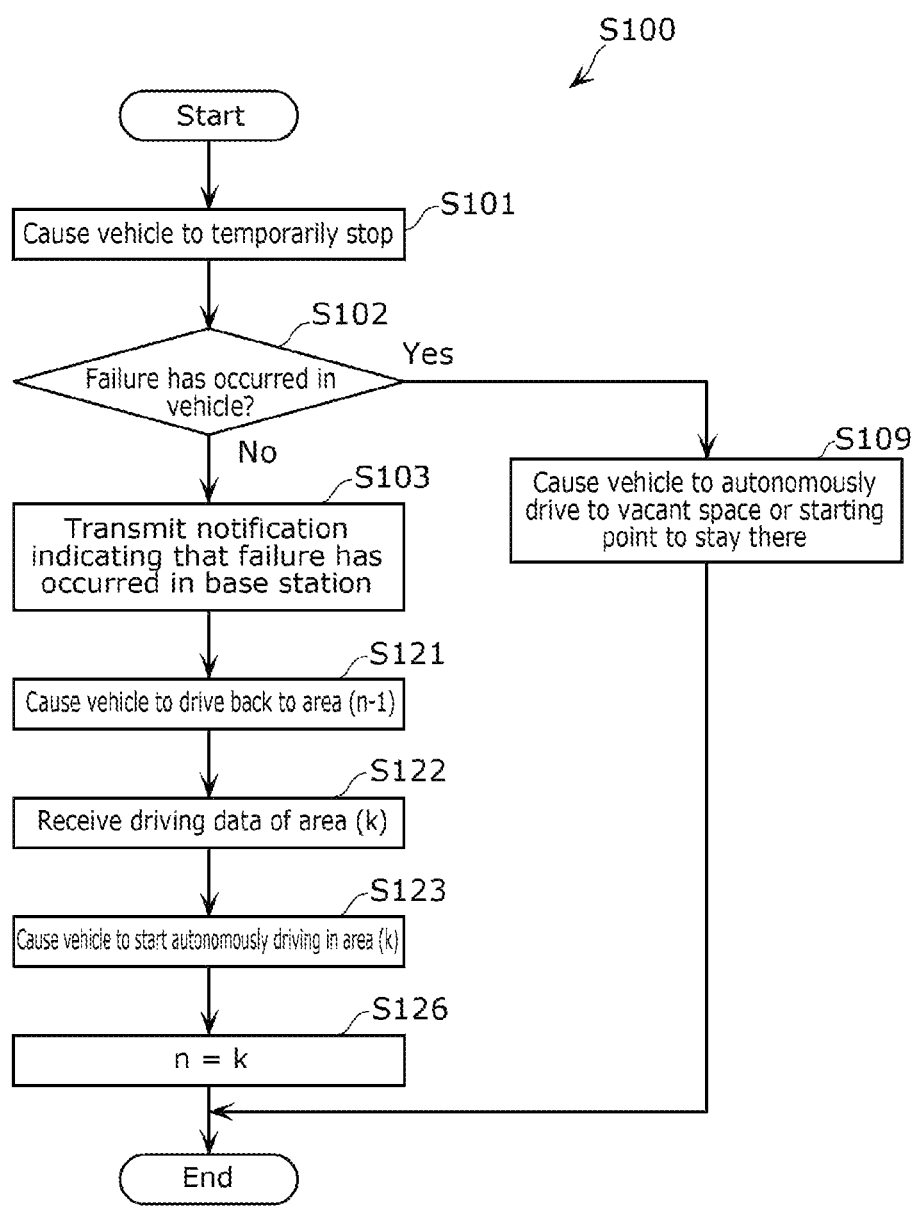
FIG. 10 is a flowchart showing an example of reception failure processing performed by a vehicle control device according to the variation of the embodiment.

FIG. 10 is a flowchart showing an example of reception failure processing performed by vehicle control device 20 according to the present variation.

First, driving controller 22 controls driver 30 to cause vehicle V to temporarily stop (step S101). Then, driving controller 22 determines whether the cause of not receiving driving data (n+1) is a failure in vehicle V, or in other words, whether a failure has occurred in vehicle communicator 23 of vehicle V (step S102).

Here, if it is determined that a failure has occurred in vehicle communicator 23 (Yes in step S102), driving controller 22 executes the processing in step S109 in the same manner as in the embodiment described above.

On the other hand, if it is determined in step S102 that a failure has not occurred in vehicle communicator 23 of vehicle V (No in step S102), driving controller 22 determines that a failure has occurred in base station (n). Then, driving controller 22 transmits a notification indicating that a failure has occurred in base station (n) to management device 10 (step S103).

Next, driving controller 22 controls driver 30 to cause vehicle V to drive back to area (n−1) (step S121). Then, vehicle communicator 23 receives driving data (k) of area (k) transmitted from management device 10 via base station (n−1) (step S122). At this time, driving controller 22 may cause vehicle communicator 23 to transmit a request signal as described above to management device 10 so as to cause vehicle communicator 23 to start receiving driving data (k). Furthermore, driving controller 22 controls driver 30 to cause vehicle V to start autonomously driving in area (k) (step S123). After that, driving controller 22 replaces variable k with variable n (step S126), and ends the reception failure processing.

In the example shown in FIG. 10 as well, as in the example shown in FIG. 6, a notification indicating that a failure has occurred in base station (n) is transmitted before vehicle V drives back to area (n−1), but may be transmitted when vehicle V has driven back to area (n−1).

Management device 10 according to the present variation performs the same processing operation as the processing operation of the embodiment described above shown in FIG. 7, except that the transmission failure processing in step S200 is performed in a manner different from that of the embodiment described above.

Figure 11:
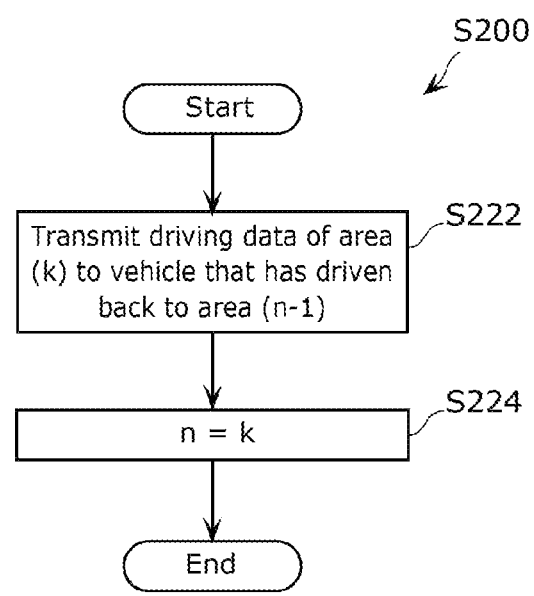
FIG. 11 is a flowchart showing an example of transmission failure processing performed by a management device according to the variation of the embodiment.

FIG. 11 is a flowchart showing an example of transmission failure processing performed by management device 10 according to the present variation.

First, communication controller 12 causes management communicator 13 to transmit driving data (k) to vehicle V that has driven back to area (n−1) via base station (n−1) (step S222). Driving data (k) is the driving data of area (k) that is located on a different route that was described above. Communication controller 12 may cause management communicator 13 to start transmitting driving data (k) when a request signal as described above transmitted from vehicle communicator 23 is received by management communicator 13.

Next, communication controller 12 replaces variable k with variable n (step S224), and ends the transmission failure processing.

As described above, in the present variation, when vehicle V cannot receive the driving data of the second area, vehicle V drives back to the previous area to receive the driving data of the third area that is located on a different route. With this configuration, vehicle V can autonomously drive to the target spot along the different route as appropriate.

Also, in management device 10 according to the present variation, when driving data (n+1) is not transmitted from base station (n) while vehicle V is in area (n), after that, driving data (n) of area (n) may not be generated. That is, if a failure occurs in base station (n), management device 10 transmits the driving data of each area except for area (n) to a following vehicle until the failure is fixed.

In other words, when the driving data of a second area is not transmitted to vehicle V while driving in a first area, driving data generator 11 generates, for a following vehicle behind vehicle V, driving data of at least one area that is located on a route from the parking facility entrance to the target spot without passing through the first area. In the example shown in FIG. 9, area (n) and area (n+1) respectively correspond to the first area and the second area.

With this configuration, the following vehicle does not drive into the first area, and thus even if a failure occurs in the base station of the first area, the following vehicle can autonomously drive to the target spot via the at least one area as appropriate.

(Other Variations)

Up to here, the management device, the vehicle control device, and the vehicle driving management system according to one or more aspects of the present disclosure have been described by way of the embodiment and the variation thereof, but the present disclosure is not limited to the embodiment and the variation given above. Other embodiments obtained by making various modifications that can be conceived by a person having ordinary skill in the art to the embodiment and the variation given above without departing from the scope of the present disclosure are also encompassed within the scope of the one or more aspects of the present disclosure.

For example, from base station (n−1) of area (n−1), in the embodiment given above, the driving data of the first route such as driving data (n+1) is transmitted. In the variation given above, the driving data of the second route such as driving data (k) is transmitted. Communication controller 12 of management device 10 may switch the driving data transmitted from base station (n−1) between the driving data of the first route and the driving data of the second route. For example, communication controller 12 may be configured to recognize the degree of congestion of vehicles in each area of the parking facility, and switch the driving data transmitted from base station (n−1) according to the degree of congestion. Specifically, when there are more vehicles in the areas included in the second route than in the areas included in the first route, communication controller 12 switches the driving data transmitted from base station (n−1) to the driving data of the first route. Conversely, when there are more vehicles in the areas included in the first route than in the areas included in the second route, communication controller 12 switches the driving data transmitted from base station (n−1) to the driving data of the second route. With this configuration, it is possible to cause each vehicle to smoothly arrive at their target spot.

Also, the target spot may be changed. For example, the target spot may be changed to a vacant parking space in a different area.

Also, in each of the embodiments and variations described above, the structural elements may be configured using dedicated hardware, or may be implemented by executing a software program suitable for the structural elements. The structural elements may be implemented by a program executor such as a CPU (Central Processing Unit) or a processor reading and executing a software program recorded in a recording medium such as a hard disk or a semiconductor memory. Here, the program for implementing the devices and the like of the embodiments and variations described above causes a computer to execute the steps of the flowchart shown in any one of FIGS. 5 to 8 and FIGS. 10 and 11.

The following configurations are also encompassed in the scope of the present disclosure.

(1) At least one device described above is, specifically, a computer system that includes a microprocessor, a ROM (Read Only Memory), a RAM (Random Access Memory), a hard disk unit, a display unit, a keyboard, a mouse, and the like. A computer program is stored in the RAM or the hard disk unit. The functions of the at least one device described above are achieved as a result of the microprocessor operating in accordance with the computer program. Here, the computer program is composed of a combination of a plurality of instruction codes that indicate instructions for the computer to achieve predetermined functions.

(2) Some or all of the structural elements that constitute at least one device described above may be composed of a single system LSI (Large Scale Integration). The system LSI is a super multifunctional LSI manufactured by integrating a plurality of structural elements on a single chip, and is specifically a computer system that includes a microprocessor, a ROM, a RAM, and the like. A computer program is stored in the RAM. The functions of the system LSI are achieved as a result of the microprocessor operating in accordance with the computer program.

(3) Some or all of the structural elements that constitute at least one device described above may be composed of an IC card or a single module that can be attached and detached to and from the device. The IC card or the module is a computer system that includes a microprocessor, a ROM, a RAM, and the like. The IC card or the module may include the above-described super multifunctional LSI. The functions of the IC card or the module are achieved as a result of the microprocessor operating in accordance with a computer program. The IC card or the module may have tamper resistance.

(4) The present disclosure may be any of the methods described above. Also, the present disclosure may be a computer program that implements the method by using a computer, or may be a digital signal generated by the computer program.

Also, the present disclosure may be implemented by recording the computer program or the digital signal in a computer readable recording medium such as, for example, a flexible disk, a hard disk, a CD (Compact Disc)-ROM, a DVD, a DVD-ROM, a DVD-RAM, a BD (Blu-ray (registered trademark) Disc), a semiconductor memory, or the like. Also, the present disclosure may be a digital signal recorded in the recording medium.

Also, the present disclosure may be implemented by transmitting the computer program or the digital signal via a telecommunication line, a wireless or wired communication line, a network as typified by the Internet, data broadcasting, or the like.

Also, the present disclosure may be implemented by an independent computer system by transferring the program or the digital signal by recording on a recording medium, or by transferring the program or the digital signal via a network or the like.

While an embodiment has been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent applications including specification, drawings and claims are incorporated herein by reference in their entirety: Japanese Patent Application No. 2020-215876 filed on Dec. 24, 2020.

INDUSTRIAL APPLICABILITY

The present disclosure is applicable to, for example, a device and a system that manage the driving of vehicles in an automated valet parking environment, or the like.

The invention claimed is:

1. A management device, comprising:
    a circuit; and
    at least one memory,
    wherein the circuit, in operation:
        in a case where a vehicle is to drive from a predetermined position to a target spot via a plurality of areas, generates driving data for each of the plurality of areas, the driving data indicating a driving path in each corresponding area and causing the vehicle to autonomously drive along the driving path;
        while the vehicle is driving in a first area of the plurality of areas, transmits first driving data of a second area of the plurality of areas, which is subsequent to the first area, to the vehicle via a first base station of the first area; and
        when second driving data of a third area of the plurality of areas, which is subsequent to the second area of the plurality of areas, is not transmitted to the vehicle via a second base station of the second area while the vehicle is autonomously driving in the second area, after the vehicle has driven back to the first area where the vehicle was driving before driving into the second area, transmits third driving data of a different area to the vehicle via the first base station of the first area,
    wherein the different area is different than the second area.

2. The management device according to claim 1,
    wherein the circuit transmits the second driving data of the third area as the third driving data of the different area.

3. The management device according to claim 1,
    wherein, when there are two routes including: a first route that is from the first area to the target spot via the second area and the third area; and a second route that is from the first area to the target spot via a fourth area that is different from the second area and the third area, the circuit transmits fourth driving data of the fourth area as the third driving data of the different area.

4. The management device according to claim 1,
    wherein, when the second driving data of the third area is not transmitted to the vehicle while the vehicle is driving in the second area, and a following vehicle behind the vehicle is to drive in the second area and the third area via the first area,
    the circuit transmits the first driving data of the second area and the second driving data of the third area to the following vehicle via the first base station of the first area while the following vehicle is driving in the first area.

5. The management device according to claim 1,
    wherein, when the second driving data of the third area is not transmitted to the vehicle while the vehicle is driving in the second area,
    the circuit further generates, for a following vehicle behind the vehicle, fourth driving data of at least one area that is located on a route from the predetermined position to the target spot without passing through the second area.

6. A vehicle control device that is mounted on a vehicle, the vehicle control device comprising:
    a circuit; and
    at least one memory,
    wherein the circuit, in operation:
        in a case where the vehicle is to drive from a predetermined position to a target spot via a plurality of areas, while the vehicle is driving in a first area of the plurality of areas, receives first driving data that indicates a driving path in a second area of the plurality of areas, which is subsequent to the first area, the first driving data being transmitted from a base station of the first area;
        causes the vehicle to autonomously drive in the second area of the plurality of areas in accordance with the first driving data that indicates the driving path in the second area;
        when second driving data of a third area of the plurality of areas, which is subsequent to a first the second area of the plurality of areas, is not received while the vehicle is autonomously driving in the second area, causes the vehicle to drive back to the first area where the vehicle was driving before driving into the second area; and
        after the vehicle has driven back to the first area, receives third driving data of a different area, the third driving data being transmitted from the base station of the first area,
    wherein the different area is different than the second area.

7. The vehicle control device according to claim 6,
    wherein the circuit receives the second driving data of the third area as the third driving data of the different area.

8. The vehicle control device according to claim 6,
    wherein, when there are two routes including: a first route that from the first area to the target spot via the second area and the third area; and a second route that is from the first area to the target spot via a fourth area that is different from the second area and the third area, the circuit receives fourth driving data of the fourth area as the third driving data of the different area.

9. A management method performed by a computer, the management method comprising:
    in a case where a vehicle is to drive from a predetermined position to a target spot via a plurality of areas, generating driving data for each of the plurality of areas, the driving data indicating a driving path in each area and causing the vehicle to autonomously drive along the driving path;
    while the vehicle is driving in a first area of the plurality of areas, transmitting first driving data of a second area of the plurality of areas, which is subsequent to the first area, to the vehicle via a first base station of the first area; and
    when second driving data of a third area of the plurality of areas, which is subsequent to the second area of the plurality of areas, is not transmitted to the vehicle via a second base station of the second area while the vehicle is autonomously driving in the second area, after the vehicle has driven back to the first area where the vehicle was driving before driving into the second area, transmitting third driving data of a different area to the vehicle via the first base station of the first area,
    wherein the different area is different than the second area.

* * * * *